UNITED STATES PATENT OFFICE.

JAMES F. EMERY, OF ALBANY, ASSIGNOR TO HIMSELF AND JAMES E. THOMSON, OF BUFFALO, NEW YORK.

IMPROVEMENT IN ADVERTISING DEVICES.

Specification forming part of Letters Patent No. 113,409, dated April 4, 1871.

*To all whom it may concern:*

Be it known that I, JAMES F. EMERY, of Albany, in the county of Albany and State of New York, have invented certain Improvements in Writing-Paper, of which the following is a specification, reference being had to the accompanying drawing.

My invention relates to writing-paper; and consists in having the lines thereon for writing purposes formed of fine-printed matter, instead of being ruled thereon with ink, in the ordinary manner.

In the drawing, the figure represents a sheet of letter-paper having its lines for writing purposes formed of fine-printed matter.

As is well known, writing-paper is provided ordinarily with plain ruled lines, as a guide for the person writing thereon.

The object of this invention is not only to furnish lines that will serve as a guide to the writer, but also to furnish them in the form of printed matter. This is accomplished by setting up any subject-matter in fine type, and printing the same on writing-paper A, so as to form lines B, for writing purposes, as clearly shown in the drawing.

As this printed matter may relate to any subject or business, it is obvious that the lines thus formed will serve as a guide for the writer, and may also, if desired, be made to embody and convey facts, information, advertising-matter, &c.

Having thus described my invention, what I claim is—

Writing-paper having the guide-lines thereon for writing purposes formed of fine-printed matter, substantially as and for the purposes set forth.

JAMES F. EMERY.

Witnesses:
EDWARD D. RENAN,
DAVID A. THOMPSON.